United States Patent
Kropsch

(10) Patent No.: US 9,412,990 B2
(45) Date of Patent: Aug. 9, 2016

(54) BATTERY SYSTEM AND METHOD OF PRODUCING AN ELECTRICALLY CONDUCTIVE CONNECTION BETWEEN A CELL CONNECTOR AND AN ELECTRONIC UNIT OF A BATTERY SYSTEM

(71) Applicant: MAGNA STEYR Battery Systems GmbH & Co OG, Zettling (AT)

(72) Inventor: Thomas Kropsch, Leoben (AT)

(73) Assignee: Samsung SDI Co., Ltd., Yongin-si (KR)

( * ) Notice: Subject to any disclaimer, the term of this patent is extended or adjusted under 35 U.S.C. 154(b) by 91 days.

(21) Appl. No.: 14/265,245

(22) Filed: Apr. 29, 2014

(65) Prior Publication Data

US 2014/0322574 A1 Oct. 30, 2014

(30) Foreign Application Priority Data

Apr. 29, 2013 (EP) .................................... 13165818

(51) Int. Cl.
*H01M 2/20* (2006.01)
*H01M 10/48* (2006.01)
*H01M 10/42* (2006.01)

(52) U.S. Cl.
CPC ............ *H01M 2/206* (2013.01); *H01M 10/425* (2013.01); *H01M 10/48* (2013.01); *H01M 10/482* (2013.01); *H01M 2/202* (2013.01); *H01M 2010/4271* (2013.01); *H01M 2010/4278* (2013.01); *H01M 2220/20* (2013.01); *Y10T 29/49108* (2015.01)

(58) Field of Classification Search
CPC ... H01M 2/206; H01M 10/48; H01M 10/425; H01M 10/482
USPC ............................................. 429/90; 29/623.1
See application file for complete search history.

(56) References Cited

U.S. PATENT DOCUMENTS 6,168,470 B1 * 1/2001 Ikeda .................. H01M 2/1083
439/620.08
2011/0180291 A1 7/2011 Matthias et al.
2012/0038365 A1 2/2012 Nagata

FOREIGN PATENT DOCUMENTS

| CN | 20143814 U | 4/2010 |
|---|---|---|
| CN | 102089902 A | 6/2011 |
| DE | 20 2009 006254 U1 | 7/2009 |
| GB | 2 330 253 A A | 4/1999 |
| WO | 2012/131809 A1 | 10/2012 |

OTHER PUBLICATIONS

SIPO Office action dated Nov. 27, 2015, with English machine translation, for correspoding Chinese Patent application 201410177075.7, (11 pages).

* cited by examiner

*Primary Examiner* — Karie O'Neill Apicella
(74) *Attorney, Agent, or Firm* — Lewis Roca Rothgerber Christie LLP

(57) ABSTRACT

A battery system and a method for producing an electrically conductive connection in a battery system. The battery system includes a plurality of cells arranged in at least one stack, a cell connector to connect a pole of a first cell in an electrically conductive manner to a pole of a second cell, an electronic unit to detect the voltage of the cells, a first pin arranged on the cell connector, at least one second pin arranged on the electronic unit; and a conductor to connect the first pin in an electrically conductive manner to the second pin, the conductor having at least one flexible section, a first contact element connected in an electrically conductive manner to a first end of the flexible section and also to the first pin, and a second contact element connected in an electrically conductive manner to a second end of the flexible section and also to the second pin.

18 Claims, 2 Drawing Sheets

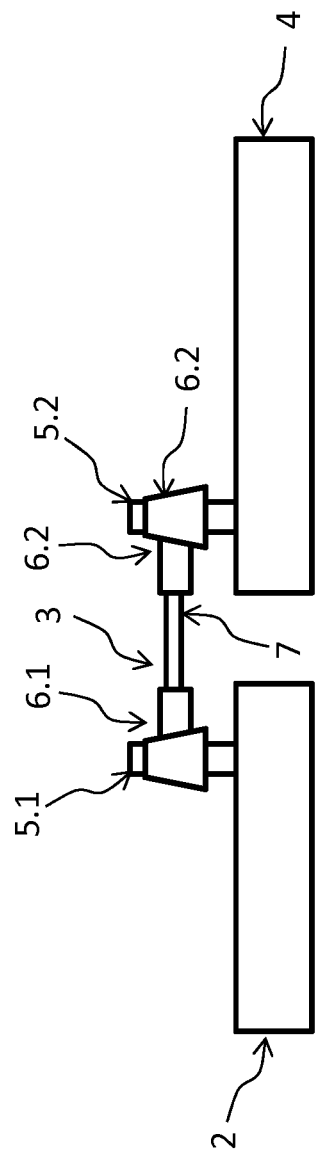
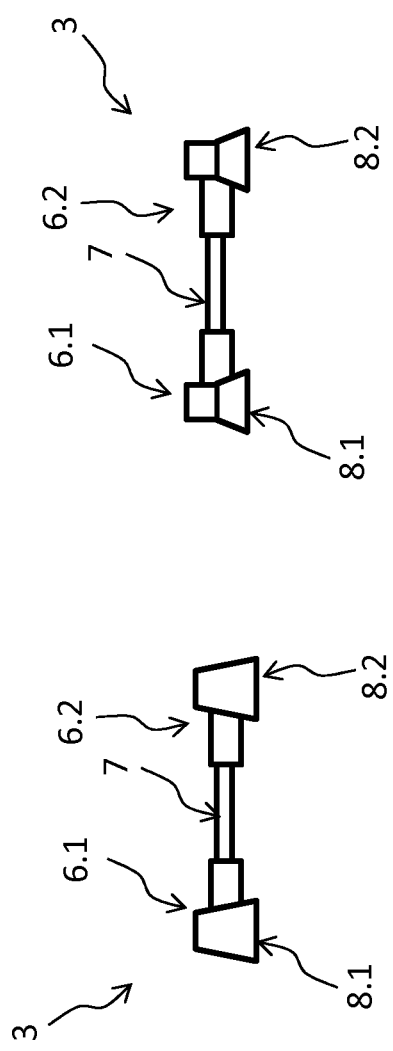

BATTERY SYSTEM AND METHOD OF PRODUCING AN ELECTRICALLY CONDUCTIVE CONNECTION BETWEEN A CELL CONNECTOR AND AN ELECTRONIC UNIT OF A BATTERY SYSTEM

CROSS-REFERENCE TO RELATED APPLICATIONS

The present application claims priority under 35 U.S.C. §119 to European Patent Publication No. EP 13165818.9 (filed on Apr. 29, 2013) which is hereby incorporated by reference in its entirety.

TECHNICAL FIELD

Embodiments relate to a battery system comprising a plurality of cells that are arranged in at least one stack, with a pole of a first cell being connected in an electrically conductive manner to a pole of a second cell by way of a cell connector. An electronic unit is configured to detect the voltage of the cells, in which a first pin is arranged on the cell connector and at least one second pin is arranged on the electronic unit. A conductor facilitates an electrically conductive connection between the first pin and the second pin, the conductor having at least one flexible section.

Embodiments further relate to a method for producing an electrically conductive connection between a first pin that is arranged on a cell connector, which is connected to poles of at least two cells of a battery system, and a second pin that is arranged on an electronic unit.

BACKGROUND

Battery systems having a plurality of cells are used as energy storage devices in motor vehicles, by way of example for driving electric vehicles and hybrid vehicles.

A battery system of the generic type is known from German Patent Publication No. DE 11 2011 101 397 T5. A connecting structure for a wiring element is disclosed, wherein a soldered section is formed on an end section of a bus bar. A protruding part that is embodied in the form of a pin is formed in the soldered section. The protruding part is guided through a perforated section of the wiring element. The wiring element is formed by way of a flexible circuit board. The protruding part that is guided through the perforated section and a circuit pattern of the wiring element are soldered one to the other.

In the case of the known applications, a high level of automation when assembling the battery system is desired, as is a reliable electrical connection over the entire serviceable life between the cell connector and the electronic unit by way of the conductor. The voltage of the cells is directed by way of this electrical connection to the electronic unit for evaluations purposes. Furthermore, the electronic unit is frequently designed so as to purposefully reduce the charge state of the cells by way of a discharge process by way of a resistor that may be switched parallel to each cell, wherein the current circuit is directed by way of the conductor for this discharge process. An increase in the transition resistance between the electrical connection between the cell connector and the electronic unit would be directly included in the evaluation process as a measuring error, since an increased voltage would drop off at the increased transition resistance. This is particularly undesirable when using lithium ion cells since in the case of this type of cells the cell voltage changes only slightly in a significant range of the charge content. As a result of agitations and vibrations that occur during the operation of the motor vehicle, the transition resistance of a solder connection can increase or the solder connection can separate, which is also undesirable.

SUMMARY

Embodiments relate to enhanced battery systems that provide for an automated electrically conductive connection between a cell connector and an electronic unit with a high degree of process safety and reliability, and in such a manner that a good degree of tolerance with respect to vibrations and agitations may be achieved.

Embodiments relate to a method in which an electrically conductive connection between a cell connector and an electronic unit of a battery system may be achieved in an automated manner and with a good degree of tolerance with respect to vibrations and agitations.

In accordance with embodiments, a battery system may include at least one of: a plurality of cells that are arranged in at least one stack, wherein a pole of a first cell is connected in an electrically conductive manner to a pole of a second cell by way of a cell connector; an electronic unit that is designed to detect the voltage of the cells, wherein a first pin is arranged on the cell connector and at least one second pin is arranged on the electronic unit; and a conductor having at least one flexible section and which facilitates an electrically conductive connection between the first pin and the second pin, the conductor also having a first contact element that is connected in an electrically conductive manner to a first end of the flexible section, the first contact element being connected in an electrically conductive manner to the first pin, and the conductor also having a second contact element that is connected in an electrically conductive manner to a second end of the flexible section, wherein the second contact element is connected in an electrically conductive manner to the second pin.

In accordance with embodiments, the first pin is fixedly connected to the cell connector. The first pin may be connected to the cell connector in a press-in fit or welded manner. As a consequence, a permanently fixed positive-locking or bonded connection is achieved. The second pin may be fixedly connected to the electronic unit, by way of example, by way of a press-in fit or by way of a solder connection. Numerous methods for producing a solder connection for electronic units are known, which methods may also be suitable for loadings that occur in a motor vehicle. By way of example, the second pin may be fastened to the electronic unit during a reflow soldering process. However, soldering methods of this type are not suitable for use in the battery system since the cells would be considerably damaged during the high temperatures in the soldering furnace.

The flexible section of the conductor having a contact element on each end prevents bending stresses on the first pin and on the second pin, as a consequence of which the tolerance of the connection with respect to a vibration loading is further enhanced.

In accordance with embodiments, the first contact element comprises a first sleeve that is designed to encompass at least one section of the first pin. The second contact element comprises a second sleeve that is designed to encompass at least one section of the second pin. The first sleeve may be mechanically connected via welding to the first pin, the second sleeve may be mechanically connected via welding to the second pin. The connection that is formed in this manner between a first/second contact element and a first/second sleeve may be produced in a simple and automated manner, and is characterised by a good degree of durability. As an alternative to the weld connection, it may also be possible to select any connecting technique by way of which a permanently electrically conductive connection may be produced in an automated manner. By way of example, the connection between a first/second pin and a first/second sleeve may be embodied by way of a mechanical connection, a crimp connection may be particularly used. In this case, the first/second sleeve forms a corresponding crimp geometry. As an alternative or also in addition thereto, it is also possible to adhere the first/second pin to the first/second sleeve by way of a good electrically conductive adhesive.

In accordance with embodiments, the first contact element may be connected to the first end of the flexible section by way of a crimp connection. The second contact element may be connected to the second end of the flexible section likewise by way of a crimp connection. Crimp connections are characterised likewise by way of a safe and reliable production process that may be easily automated. The first contact element and also the second contact element may be embodied in one piece, by way of example, as a press formed part.

In accordance with embodiments, the first and/or second sleeve has/have a conical shape at least in sections. The conical shape at least in sections of the sleeve simplifies the manner in which the join between the sleeve and the first/second pin is achieved. This simplifies the process of automating the production of the connection.

In accordance with embodiments, a method for producing an electrically conductive connection between a first pin that is arranged on a cell connector which is connected to poles of at least two cells of a battery system, and a second pin that is arranged on an electronic unit, by way of a conductor that comprises a flexible section and a first contact element and a second contact element, the method including at least one of: pushing a first sleeve of the first contact element onto the first pin; welding the first sleeve to the first pin; pushing a second sleeve of the second contact element onto the second pin; and welding the second sleeve to the second pin.

In accordance with embodiments, a battery system may include at least one of: a plurality of cells arranged in at least one stack; a cell connector to connect a pole of a first cell in an electrically conductive manner to a pole of a second cell; an electronic unit to detect the voltage of the cells; a first pin arranged on the cell connector; at least one second pin arranged on the electronic unit; and a conductor to connect the first pin in an electrically conductive manner to the second pin, the conductor having at least one flexible section, a first contact element connected in an electrically conductive manner to a first end of the flexible section and also to the first pin, and a second contact element connected in an electrically conductive manner to a second end of the flexible section and also to the second pin.

In accordance with embodiments, a method for producing an electrically conductive connection may include at least one of: providing a battery system having a plurality of cells, a cell connector, an electronic unit and a conductor having a flexible section, a first contact element and a second contact element; providing a first pin on the cell connector which is connected to poles of at least two cells of the battery system; providing a second pin arranged on the electronic unit by way of the conductor; inserting a first sleeve of the first contact element onto the first pin; establishing a connection between the first sleeve and the first pin; inserting a second sleeve of the second contact element onto the second pin; and establishing a connection between the second sleeve and the second pin.

DRAWINGS

Embodiments are described hereinunder by way of example with reference to the drawings.

FIG. 2 illustrates a detailed view of a battery system, in accordance with embodiments.

FIG. 3 illustrates a conductor for a battery system, in accordance with embodiments.

FIG. 4 illustrates a conductor for a battery system, in accordance with embodiments.

DESCRIPTION

Figure 1:
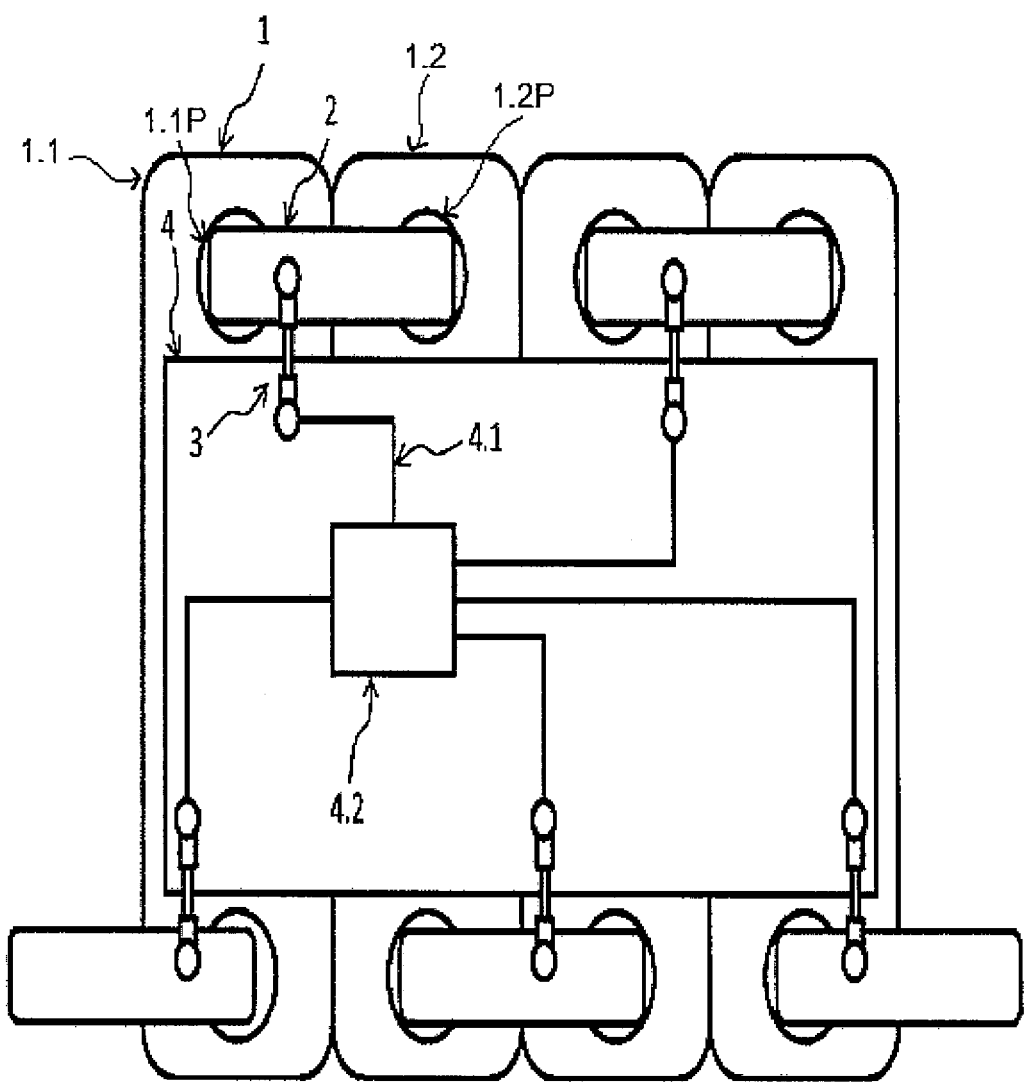
FIG. 1 illustrates a schematic view of a battery system, in accordance with embodiments.

FIG. 1 illustrates a schematic view of a battery system a battery system, in accordance with embodiments. A plurality of cells 1 are arranged in a row one next to the other and the cells 1 are mutually connected in an electrically conductive manner by way of cell connectors 2. For this purpose, a cell connector 2 is connected in an electrically conductive manner to a pole 1.1P of a first cell 1.1 and to a pole 1.2P of a second cell 1.2 by way of example by way of a screw connection or a weld connection. Each cell connector 2 is connected in an electrically conductive manner by way of a conductor 3 to a transmission line 4.1 of an electronic unit 4. The transmission line 4.1 may be embodied by way of example as a conductor track on a control board. The voltage potential that is tapped in this manner at the cell connectors 2 is transmitted by way of the transmission line 4.1 to a signal processing unit 4.2 of the electronic unit 4. The signal processing unit 4.2 is designed or otherwise configured to detect and evaluate the voltage potentials that are tapped at the different cells connectors 2.

FIG. 2 illustrates a detailed view of the battery system, in which the cells 1 are not illustrated for reasons of clarity. A first pin 5.1 that is connected in an electrically conductive manner to the cell connector 2 is arranged on the cell connector 2. The first pin 5.1 may be inserted or otherwise pressed into the cell connector 2. As an alternative thereto, the first pin 5.1 may be embodied as one piece with the cell connector 2, by way of example, as an upwardly curved protrusion of the cell connector 2, or the first pin 5.1 may be mechanically connected via welding to the cell connector 2.

A second pin 5.2 that is connected in an electrically conductive manner to the transmission line 4.1 is arranged on the electronic unit 4. The second pin 5.2 may be soldered to a contact surface of the electronic unit 4, or may be inserted or pressed into a receiving hole in the electronic unit 4.

The conductor 3 has a first contact element 6.1, a second contact element 6.2 and a flexible section 7. The first contact element 6.1 is connected in an electrically conductive manner to the first pin 5.1, the second contact element 6.2 is connected in an electrically conductive manner to the second pin 5.2. The connection may be performed mechanically by way of welding. The flexible section 7 is connected in an electrically conductive manner to the first contact element 6.1 and to the second contact element 6.2, by way of a crimp connection. For this purpose, a crimp section is formed on the first contact element 6.1 and on the second contact element 6.2.

FIG. 3 illustrates a conductor 3, in accordance with embodiments. The first contact element 6.1 has a first sleeve 8.1. The first sleeve 8.1 has a conical shape over the entire sleeve, which facilitates the mounting process onto the first pin 5.1. The second contact element has a second sleeve 8.2 that likewise has a conical shape.

FIG. 4 illustrates a conductor 3, in accordance with embodiments. The first sleeve 8.1 and the second sleeve 8.2 have a conical shape only in sections. The conical shaped section of the first sleeve 8.1 and of the second sleeve 8.2 facilitate the mounting process onto the first pin 5.1 and the second pin 5.2, whereas the section that has a constant cross-section provides a good hold on the first pin 5.1 and the second pin 5.2. This enhances the quality of the weld connection.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Cell
1.1 First cell
1.2 Second cell
1.1P Pole of the first cell
1.2P Pole of the second cell
2 Cell connector
3 Conductor
4 Electronic unit
4.1 Transmission line
4.2 Signal processing unit
5.1 First pin
5.2 Second pin
6.1 First contact element
6.2 Second contact element
7 Flexible section
8.1 First sleeve
8.2 Second sleeve

What is claimed is:

1. A battery system comprising:
    a plurality of cells arranged in a row;
    a cell connector electrically connecting a pole of a first cell from among the cells to a pole of a second cell from among the cells;
    an electronic unit to detect the voltage of the cells;
    a first pin protruding from the cell connector;
    a second pin protruding from the electronic unit; and
    a conductor electrically connecting the first pin to the second pin, the conductor comprising:
        a flexible section;
        a first contact element electrically connected to a first end of the flexible section and to the first pin; and
        a second contact element electrically connected to a second end of the flexible section and to the second pin.

2. The battery system of claim 1, wherein the first contact element comprises a first sleeve to encompass at least one section of the first pin.

3. The battery system of claim 2, wherein the first sleeve is mechanically connected to the first pin.

4. The battery system of claim 3, wherein the mechanical connection comprises a weld.

5. The battery system of claim 1, wherein the first contact element is connected to the first end of the flexible section by way of a crimp connection.

6. The battery system of claim 1, wherein the second contact element comprises a second sleeve to surround at least a portion of the second pin.

7. The battery system of claim 6, wherein the second sleeve is mechanically connected to the second pin.

8. The battery system of claim 7, wherein the mechanical connection comprises a weld.

9. The battery system of claim 1, wherein the second contact element is connected to the second end of the flexible section by way of a crimp connection.

10. The battery system of claim 2, wherein at least a portion of the first sleeve has a conical shape.

11. The battery system of claim 6, wherein at least a portion of the second sleeve has a conical shape.

12. The battery system of claim 2, wherein the second contact element comprises a second sleeve to surround at least a portion of the second pin, and
    wherein at least portions of each of the first sleeve and the second sleeve have a conical shape.

13. A method for producing an electrically conductive connection, the method comprising:
    providing a battery system comprising:
        a plurality of cells;
        a cell connector being electrically connected to at least two of the cells, the cell connector comprising a first pin protruding from the cell connector;
        an electronic unit comprising a second pin; and
        and a conductor comprising a flexible section, a first contact element, and a second contact element, the conductor electrically connecting the cell connector and the electronic unit;
    inserting a first sleeve of the first contact element onto the first pin to establish an electrical connection between the first sleeve and the first pin; and
    inserting a second sleeve of the second contact element onto the second pin to establish an electrical connection between the second sleeve and the second pin.

14. The method of claim 13, further comprising routing the conductor from the first pin to the second pin.

15. The method of claim 13, further comprising routing the conductor from the second pin to the first pin.

16. The method of claim 13, further comprising producing a crimp connection between the first contact element and a first end of the flexible section.

17. The method of claim 13, further comprising producing a crimp connection between the second contact element and a second end of the flexible section.

18. The method of claim 13, further comprising cutting the flexible section to length.

* * * * *